United States Patent Office 2,876,169
Patented Mar. 3, 1959

2,876,169

RIBOFLAVIN PROCESS

Ronald C. Malzahn, Robert F. Phillips, and Austin M. Hanson, Muscatine, Iowa, assignors to Grain Processing Corporation, Muscatine, Iowa, a corporation of Iowa No Drawing. Application March 26, 1956
Serial No. 573,604

15 Claims. (Cl. 195—28)

This invention relates to an improved process for producing riboflavin and more particularly to a process for producing riboflavin by the cultivation of the microorganism *Ashbya gossypii* in a nutrient medium.

The yeast-like organism *Ashbya gossypii* is known to produce substantial quantities of riboflavin under proper conditions of cultivation. Generally the yields of riboflavin that have been consistently obtainable by the cultivation of this organism have fallen within the range of 500 to 800 micrograms per milliliter. Occasionally yields of riboflavin have been reported as high as 1000 to 1500 micrograms per milliliter, but it has not always been possible consistently to duplicate these high yields either in the laboratory or in commercial operation. The energy source for the growth of this organism, in accordance with published prior art procedures, has been glucose, and it has been proposed that the riboflavin yields can be significantly increased if the glucose is added to the fermenting medium in increments as the fermentation proceeds. However, the feeding of fermentations in this fashion involves some trouble and expense on the part of the operator; and in addition by utilizing such a process it is not possible consistently to obtain the high yields that have been claimed for such a process. Recently it has been learned that yields of riboflavin on the order of 1500 to 2000 micrograms per milliliter can be achieved if a lipid such as corn oil is used as the sole energy source for the microorganism.

Accordingly it is an object of the invention to provide a process for producing riboflavin utilizing the organism *Ashbya gossypii* in which it is possible consistently to obtain high yields in excess of 2000 or even 5000 micrograms per milliliter.

A further object of this invention is the provision of a riboflavin-producing process in which it is not necessary periodically to feed the fermenting substrate with a metabolizable material.

It is a still further object of this invention to provide a process of producing riboflavin by a fermentation procedure in which the medium to be fermented may be subjected to prolonged heat sterilization without adversely affecting the medium.

A further object of this invention is the provision of a process for producing riboflavin in high concentration wherein the fermentation medium contains ingredients which are readily obtainable.

Further and additional objects will appear from the following description and the appended claims.

In accordance with one embodiment of this invention it has been found that the microorganism *Ashbya gossypii* produces riboflavin in very high yields if the nitrogen source in the nutrient medium comprises a degraded protein which is the product of the enzymatic digestion of a collagenous material particularly where a lipid or fatty acid glyceride is utilized as the source of energy. Thus it has been discovered that high yields of riboflavin are obtainable when a lipid, such as corn oil, soybean oil, linseed oil, palm oil, lard, lard oil, olive oil, or cocoanut oil is employed as a primary source of energy for growth and the enzymatically digested collagen constitutes the primary source of nitrogen for the microorganism. While the nutrient medium containing the aforesaid metabolizable lipid may be supplemented with an energy-producing carbohydrate such as glucose, it has been found that increased yields of riboflavin are obtainable if the nutrient medium is substantially free of glucose or other metabolizable carbohydrate.

In order to insure consistently high yields of riboflavin by the process of this invention, the nutrient medium containing the metabolizable lipid and the previously enzymatically degraded collagen should also contain an accessory substance such as corn steep liquor, ethyl stillage, dry distillers' solubles or brewers' yeast. In accordance with the present invention the enzymatically degraded proteinaceous material herein contemplated is collagen which, along with elastin, is the main constituent of animal connective tissue. It has been found that collagenous proteins which have been enzymatically treated are unexpectedly superior as a nutrient for *Ashbya gossyppi* in a riboflavin producing process. From a nutritional standpoint the results obtained with this protein are surprising since it is deficient in many of the amino acids essential for the life of man and domestic animals. It was unexpected that when collagen type proteins from various sources are enzymatically hydrolyzed and incorporated in a medium for the growth of *Ashbya gossypii* that yields of riboflavin would be obtained which are in the range of 2000 or 3000 micrograms per milliliter, and even as high in some instances as 5000 micrograms per milliliter. The proteins characterized as collagens which are useful in the preparation of these nutrients are exemplified by gelatin, hide and bone glue which is sometimes characterized as a semisolid glue, and the proteins contained in the liquor remaining from lard rendering processes sometimes called collagen concentrates.

As will be apparent from the following description, the accessory substance is preferably corn steep liquor and is preferably present in the nutrient medium in amounts in excess of 0.5% and it is most preferred that it be present in amounts between about 0.65% and about 2.5% by weight (dry basis). The enzymatically treated collagenous protein is usually present in the nutrient medium of this invention in amounts in excess of 0.4%, preferably between about 0.65% and 3.0% by weight (dry basis). The amount of metabolizable lipid material added to the nutrient medium in order to obtain optimum yields of riboflavin is preferably in excess of about 1% by weight (dry basis). It is usually not feasible or desirable to add more than about 5.5% or 6.0% by weight (dry basis) of the lipid since further additions do not appear to increase the riboflavin yield in the fermentation process. Excellent and consistently high riboflavin yields are obtainable if the concentration of the lipid is between about 2% and 5% by weight and the concentrations of the enzymatically degraded collagenous protein and the accessory substance are each between about 1% and 1.5% by weight (dry basis).

It has also been found that the addition of an amino acid, namely glycine, is beneficial in raising the yield of riboflavin when added to the above described nutrient media, and accordingly it is a preferred embodiment of the present invention that the foregoing nutrient media contain a small amount of glycine preferably between about 0.05% and about 0.4% by weight (dry basis). The amino acids proline, threonine and β-alanine may be used in place of glycine if desired.

In carrying out this invention in one form, a nutrient medium is prepared comprising water to which is added from 2% to 5% by weight (dry basis) of corn oil, from 1% to 1½% by weight (dry basis) of corn steep liquor, and from 1% to 1½% by weight (dry basis) of a peptone produced by the enzymatic digestion of a collagen protein. This medium may have an initial pH ranging between about 5.4 and 7.4, preferably between about 6.0 and 6.2. It is then sterilized in the fermentation vessel for forty to sixty minutes at about 123° C. After cooling, the sterilized medium in the vessel is then inoculated with 1% of an 18 to 24 hour liquid culture of *Ashbya gossypii* and allowed to ferment at about 28° C. for a period of seventy-two to ninety-six hours in accordance with the usual practice. During fermentation the medium is subjected to continuous seration in order to provide the necessary aerobic conditions for the submerged culture growth of the organism. The amount of air introduced below the surface of the fermentation liquid may suitably be about 15 cubic feet per minute for each 10 cubic feet of liquid medium in the fermenting vessel. After the fermentation has been completed the medium will be found to contain a relatively high concentration of riboflavin usually in excess of 2000 micrograms per milliliter and often in excess of 3000 micrograms per milliliter. The pH of the medium is adjusted to below 6.0, preferably to 5.5, and the medium is evaporated and drum dried to produce a solid suitable for incorporation into an animal feed. If a high purity riboflavin product is desired, the cells of the microorganism are separated from the fermentation liquor by any desired means, such as filtration, centrifuging, or the like, and the riboflavin is separated from the resulting liquor by any of the well known procedures including fractional precipitation, or solution, or adsorption on a suitable adsorbent material such as fuller's earth or adsorbent clay from which it may be separated by a suitable eluting solvent. The conditions under which the fermentation is carried out and the method of separating the riboflavin from the fermentation liquor are well known in the art, and it is not believed to be necessary to repeat them here. The temperature conditions in the fermenter, as indicated above, are preferably about 28° C., but may range from about 25° C. to about 32° C., and broadly may be as low as 20° C. and as high as 40° C.

As indicated above, an important feature of this invention is the provision of a nutrient medium for the *Ashbya gossypii* fermentation process which contains a degraded collagenous protein. The degradation of the collagen is carried out by a proteolytic enzyme, such as for example papain, ficin, pepsin, pancreatin, and the like. Proteolytic enzymes which have been found to be useful are sold under trade names such as Prolase 40 and B–400, which are products of Wallerstein Laboratories of New York, and P–11 which is sold by Rohm & Haas Company of Bristol, Pennsylvania. A variety of proteolytic enzymes have been used with equally good success. The enzyme papain is the preferred material. Briefly the conditions under which the enzyme hydrolysis is carried out are as follows: The collagenous protein substrate was made up to a concentration of 10% to 20% in water, the pH adjusted to the desired level, and the material placed in a water bath at proper temperature. After the temperature of the substrate was equilibrated with that of the water bath, the enzyme was added and dispersed. The amount added varied with the particular enzyme, and may range from 0.5% to 2% based on the substrate protein. The pH of the substrate may vary with the particular enzyme used. For papain the pH may vary from 4.5 to 8.5 with 7.5 as optimal. The temperature used for carrying out the digestion may range from 30° C., to 70° C., depending on the enzyme used. For papain the temperature was held at 60° C. to 65° C. In addition to the conventional ingredients for the enzymatic degradation of protein, it is preferred that 0.1% sodium hydrosulfite be added as an activator. It is also preferred that a small amount of sodium sulfide (0.1%) be added, this serving both as a reducing agent and precipitant for any toxic heavy metals which may be present and which may be harmful to the enzyme material. The time of digestion or enzyme hydrolysis may vary with the temperature and in the range of 60° to 65°; a period of twenty-one hours gives satisfactory results when using the enzyme papain. The amount of degradation may be followed with Sorrensen Formol titration method and varied with the substrate and the enzyme. An increase of 3% to 15% of formol nitrogen to total nitrogen is generally sufficient to give maximal yields. Excessive hydrolysis of the protein may cause a decrease in yields of riboflavin.

The period of fermentation for the present process is substantially less than that shown in the prior art which indicates considerably lower yields as heretofore indicated for a period of fermentation of nine or more days. Specifically a period of time of about five days is sufficient to give the unexpectedly high yields as indicated are possible by utilization of the process of the present invention.

As indicated above, an important feature of this invention is the provision of a nutrient medium for the *Ashbya gossypii* fermentation process which contains, in addition to the enzymatically digested collagen, a lipid such as corn oil as a primary source of energy for the growth of the fermenting microorganism wherein the concentration of the lipid in medium is in excess of about 1% by weight, the maximum amount being determined by economic considerations, it being borne in mind that the lipid is substantially insoluble in the fermenting medium. Also to obtain optimum yields it is preferred to adjust the percentage of enzymatically degraded collagen to between about 0.65% and 3% by weight (dry basis) and to adjust the percentage of corn steep liquor to between about 0.65% and 2.5% by weight (dry basis). The combined percentage of the degraded collagen material and the corn steep liquor should preferably be in excess of about 1.75% by weight (dry basis). However, the combined percentages of all the nutrients added to the medium should not ordinarily exceed about 12% by weight solids.

In order to demonstrate the heretofore referred to principles involved in the practice of this invention, a large number of experiments have been carried out which show the optimum conditions necessary for obtaining the high riboflavin yields. These tests involve the inoculation and assay of a large number of test flasks containing media of various compositions. The basic conditions utilized in all of the test procedures unless otherwise indicated involve the inoculation of the control and test flasks or media with 1% of an eighteen hour culture of *Ashbya gossypii* and the fermentations were carried out under submerged aeration conditions in a shaken flask. The incubation temperature was between about 29° and 30° C. and the fermented liquor was assayed for riboflavin by standard procedures utilizing a standard Coleman fluorometer.

In the following experiments the corn steep liquor added to the media contained roughly 50% moisture and unless otherwise noted the percentages of this material reported in the experiments are on a wet basis. In order to convert these figures to the dry basis each of the percentages of this ingredient in the several media should be divided by two.

Table I illustrates the effect of various peptones on the production of riboflavin by the process of the present invention including the utilization of the preferred collagenous protein which is indicated by gelatin. The yield of riboflavin in micrograms per milliliter obtained by the utilization of gelatin is seen to be substantially above the yields which are obtained by the utilization of conventional peptones:

TABLE I

*The effect of various peptones on the production of riboflavin by Ashbya gossypii*

| Degraded Protein | Concentration of degraded protein, percent | Riboflavin Yield, mcg./ml. |
| --- | --- | --- |
| (1) Peptic hydrolyzate of animal tissue | 1.5 | 1,520 |
| (2) Equal parts of a peptic hydrolyzate of animal tissue and pancreatic digest of casein | 1.5 | 1,280 |
| (3) Pancreatic digest of lactalbumin | 1.5 | 1,000 |
| (4) Pancreatic digest of casein | 1.5 | 340 |
| (5) Papaic digest of soybean meal | 1.5 | 673 |
| (6) Pancreatic digest of gelatin | 1.5 | 3,620 |

The foregoing table illustrates the unusually high yields of riboflavin which can be obtained by utilizing degraded collagen proteins (illustration 6) as a nutrient in the production of riboflavin.

Table II indicates the results of various experiments using collagen proteins either without treatment by an enzyme or after treatment with various proteolytic enzymes of the class hereinbefore described:

TABLE II

*Biosynthesis of riboflavin in a medium[1] of corn steep liquor, corn oil and enzymatically degraded collagen*

| Collagen protein [2] | Enzyme treatment | $\frac{\text{Percent Formol N}}{\text{Percent total N}} \times 100$ | Riboflavin Yield, mcg./ml. |
| --- | --- | --- | --- |
| Dried glue | None | 6.10 | 680 |
| Do | Prolase 40 [3] | 16.3 | 2,360 |
| Do | Ficin | 12.8 | 2,080 |
| Do | P-11 [4] | 14.5 | 2,160 |
| Do | Pepsin | 7.9 | 1,160 |
| Do | Papain | 14.8 | 2,240 |
| Collagen concentrate [5] | None | 12.3 | 1,360 |
| Do | P-11 [4] | 17.8 | 2,107 |
| Do | B-400 [3] | 15.1 | 2,000 |
| Semisolid glue | None | 2.5 | -------- |
| Do | P-11 [4] | 13.8 | 3,173 |
| Do | Papain | 6.4 | 2,430 |

[1] Basal medium: corn steep liquor, 2.75%; corn oil, 2.75%.
[2] Material present in medium at concentration of 2.1% solids.
[3] Product of Wallerstein Laboratories, New York, N.Y.
[4] Product of Rohm and Haas Co., Bristol, Pa.
[5] Concentrated protein solution obtained from lard rendering process.

As is readily apparent, the treatment of collagen protein by various proteolytic enzymes substantially raises the yield of riboflavin when such degraded protein is used as a nutrient in the cultivation of *Ashbya gossypii* as opposed to the use of collagen proteins which do not have any such enzymatic treatment.

An experiment was conducted utilizing various enzymatically degraded collagens in the conventional media for the biosynthesis of riboflavin as described above. In addition to these basic experiments illustrations are given to show the effect of small percentages of glycine added to the nutrient medium. Table III shows the results of such experiments, and it is especially to be noted that in one instance yields of riboflavin are obtained exceeding 4100 micrograms per milliliter.

TABLE III

*Effect of glycine on the biosynthesis of riboflavin in a medium[1] of corn steep liquor, corn oil and enzymatically degraded collagen*

| Degraded Collagen | Concentration of glycine, percent | Riboflavin Yield, mcg./ml. |
| --- | --- | --- |
| Dried glue [2] | ------ | 1,993 |
|  | 0.1 | 2,633 |
| Collagen concentrate [2] | ------ | 2,107 |
|  | 0.1 | 2,440 |
| Semisolid glue [3] | 0.1 | 4,187 |

[1] Basal medium: corn steep liquor, 2.75%, corn oil 2.75%.
[2] Degraded collagen added at concentration of 2.1% solids.
[3] Medium consisted of corn steep liquor (3.0%), corn oil (4.5%) and degraded semisolid glue (3.0% solids).

Thus by the addition of relatively small amounts of glycine to a nutrient medium for the cultivation of *Ashbya gossypii* it is possible to raise the yield of riboflavin substantially, and in the first two illustrations in Table III the increase amounts from about 11% to about 30% over media containing no glycine.

Table IV shows the biosynthesis of riboflavin in 100 gallon fermenters to illustrate that the novel innovation of the present invention produces the desired high yields of product when carried out on an industrial scale.

TABLE IV

*Biosynthesis of riboflavin in 100 gallon fermenters with a medium[1] of enzyme hydrolyzed collagen, corn steep liquor, corn oil and glycine*

| Enzyme treated collagen | $\frac{\text{Percent Formol N}}{\text{Percent Total N}} \times 100$ | Concentration in medium | Riboflavin Yield, mcg./ml. |
| --- | --- | --- | --- |
| Dried glue | 26.2 | 0.76 % solids | 2,280 |
|  |  | 0.76% | 2,550 |
| Semisolid glue | 26.0 | 1.15% | 2,020 |
|  |  | 1.15% | 2,740 |

[1] 2.75% corn steep liquor, 2.5% corn oil and 0.1% glycine.

While several particular embodiments of this invention are suggested above, it will be understood of course that the invention is not to be limited thereto since many modifications may be made, and it is contemplated therefore by the appended claims to cover any such modifications as fall within the true spirit and scope of this invention.

We claim:
1. A method of producing riboflavin which comprises cultivating *Ashbya gossypii* under aerobic conditions in a growth medium comprising at least 0.4 percent by weight of an enzymatically treated collagen and a metabolizable lipid.

2. A method of producing riboflavin which comprises cultivating *Ashbya gossypii* under aerobic conditions in a growth medium comprising at least 0.4 percent by weight of an enzymatically treated collagen, an accessory substance selected from the group consisting of corn steep liquor, distillers' solubles, ethyl stillage and brewers' yeast and a metabolizable lipid.

3. The method of claim 2 wherein said lipid is selected from the group consisting of corn oil, linseed oil, cottonseed oil, palm oil, olive oil, soybean oil and lard oil.

4. The method of claim 2 wherein the collagen is selected from the group consisting of gelatin, hide and bone glue, and protein contained in the residual liquor from the lard rendering process.

5. A method for the production of riboflavin which comprises inoculating a substantially carbohydrate-free nutrient medium with *Ashbya gossypii*, said medium containing more than 1 percent by weight of a metabolizable lipid, more than 0.5 percent by weight (dry basis) of an accessory substance selected from the group consisting of corn steep liquor, distillers' solubles, ethyl stillage and brewers' yeast, more than 0.4 percent by weight (dry basis) of an enzymatically treated collagen, the total solids of said nutrient medium not to exceed about 12 percent by weight, and fermenting the resulting inoculated medium under aeration conditions.

6. A method for the production of riboflavin which comprises inoculating a substantially carbohydrate-free nutrient medium with *Ashbya gossypii*, said medium containing more than 1 percent by weight of a metabolizable lipid, more than 0.5 percent by weight (dry basis) of an accessory substance selected from the group consisting of corn steep liquor, distillers' solubles, ethyl stillage and brewers' yeast, more than 0.4 percent by weight (dry basis) of an enzymatically treated collagen, and between about 0.05 and 0.4 percent by weight of glycine, the total solids of said nutrient medium not to exceed about 12 percent by weight, and fermenting the resulting inoculated medium under aeration conditions.

7. A method for the production of riboflavin which comprises inoculating a substantially carbohydrate-free medium with a culture of *Ashbya gossypii*, said medium containing between about 1 and 6.0 percent (dry basis) of a metabolizable lipid, between about 0.65 and 2.5 percent by weight (dry basis) of an accessory substance selected from the group consisting of corn steep liquor, distillers' solubles, ethyl stillage and brewers' yeast, between about 0.65 and 3 percent by weight (dry basis) of an enzymatically degraded collagen, all of the above not to exceed in total more than about 12% solids; and fermenting the resulting inoculated medium under aeration conditions.

8. A method for the production of riboflavin which comprises inoculating a substantially carbohydrate-free medium with a culture of *Ashbya gossypii*, said medium containing between about 1 and 6.0 percent (dry basis) of a metabolizable lipid, between about 0.65 and 2.5 percent by weight (dry basis) of an accessory substance selected from the group consisting of corn steep liquor, distillers' solubles, ethyl stillage and brewers' yeast, between about 0.65 and 3 percent by weight (dry basis) of an enzymatically degraded collagen, and between about 0.05 and 0.4 percent glycine, all of the above not to exceed in total more than about 12% solids; and fermenting the resulting inoculated medium under aeration conditions.

9. The method of claim 7 wherein said accessory substance is selected from the group consisting of corn steep liquor, distillers' solubles, ethyl stillage, and brewers' yeast.

10. The method of claim 7 wherein said lipid is corn oil.

11. A method of producing riboflavin which comprises cultivating *Ashbya gossypii* under aeration conditions in a substantially carbohydrate-free nutrient medium containing between about 2 and 5 percent by weight (dry basis) of corn oil, between about 1 and 1.5 percent by weight (dry basis) of corn steep liquor, between about 1 and 1.5 percent of enzymatically degraded collagen.

12. A method of producing riboflavin which comprises cultivating *Ashbya gossypii* under aeration conditions in a substantially carbohydrate-free nutrient medium containing between about 2 and 5 percent by weight (dry basis) of corn oil, between about 1 and 1.5 percent by weight (dry basis) of corn steep liquor, between about 1 and 1.5 percent of enzymatically degraded collagen, and between about 0.05 and 0.4 percent by weight (dry basis) of glycine.

13. The method of claim 11 wherein the combined dry weight percentages of all the nutrients do not exceed 12 percent.

14. The process of claim 11 wherein the cultivation is carried out at a temperature between about 25° C. and 32° C.

15. The process of claim 11 wherein the cultivation is carried out at a pH between about 5.4 and 7.4.

References Cited in the file of this patent

UNITED STATES PATENTS

| | | |
|---|---|---|
| 2,374,503 | Rudert | Apr. 24, 1945 |
| 2,445,128 | Tanner et al. | July 13, 1948 |

OTHER REFERENCES

Schopfer: Helvetica Chimica Acta V, XXVII, August 1, 1944, p. 1019.

Porter: Bacterial Chemistry and Physiology, 1946, Wiley, pp. 881–885.

Morrison: Feeds and Feeding, 1948, The Morrison Pub., Co. Ithaca, N. Y., p. 89, 595–599.

Tanner et al.: Jour. Bact., vol. 58, No. 6, December 1949, pp. 737–745.

Jacobs: Food and Food Products, vol. III, 2nd ed., Interscience Pub. Inc., N. Y., 1951, pp. 2281–2283.